Figure 1:
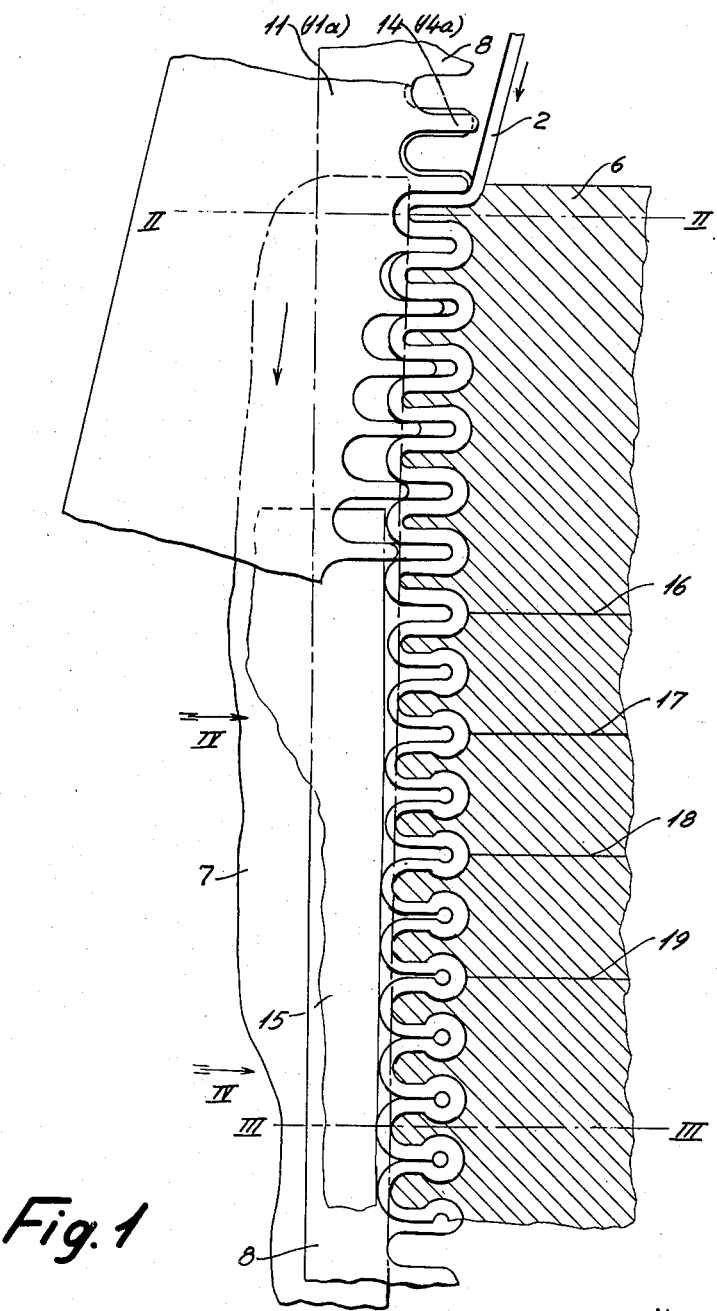

Sept. 15, 1959　　　　　H. HANSEN　　　　　2,903,745
MACHINE FOR SHAPING A STRING OR BAND INTO
SERPENTINE-LIKE CONFIGURATION
Filed Jan. 8, 1957　　　　　　　　　　　　7 Sheets-Sheet 2

INVENTOR
Harry Hansen

BY
Watson, Cole, Grindle & Watson
ATTORNEYS

INVENTOR
HARRY HANSEN

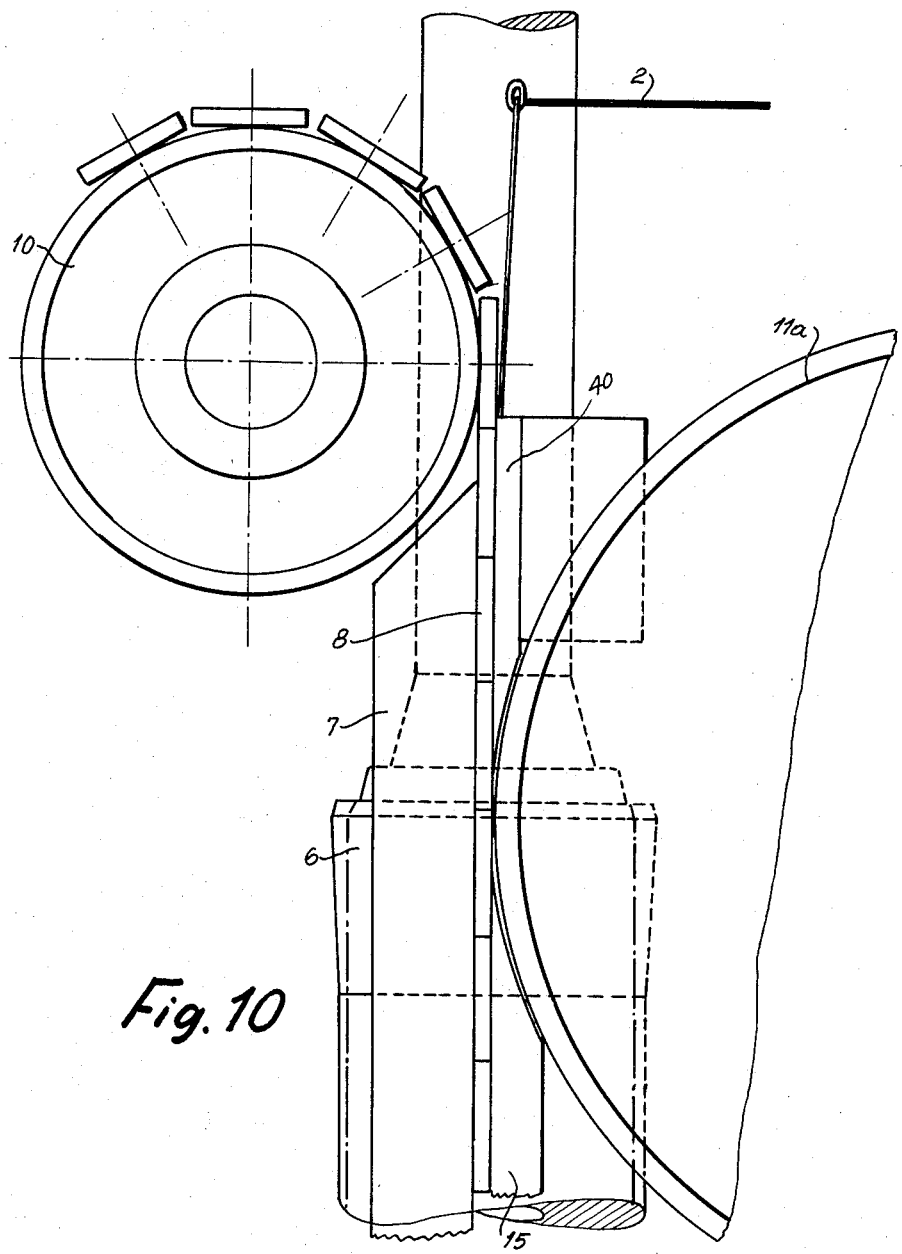

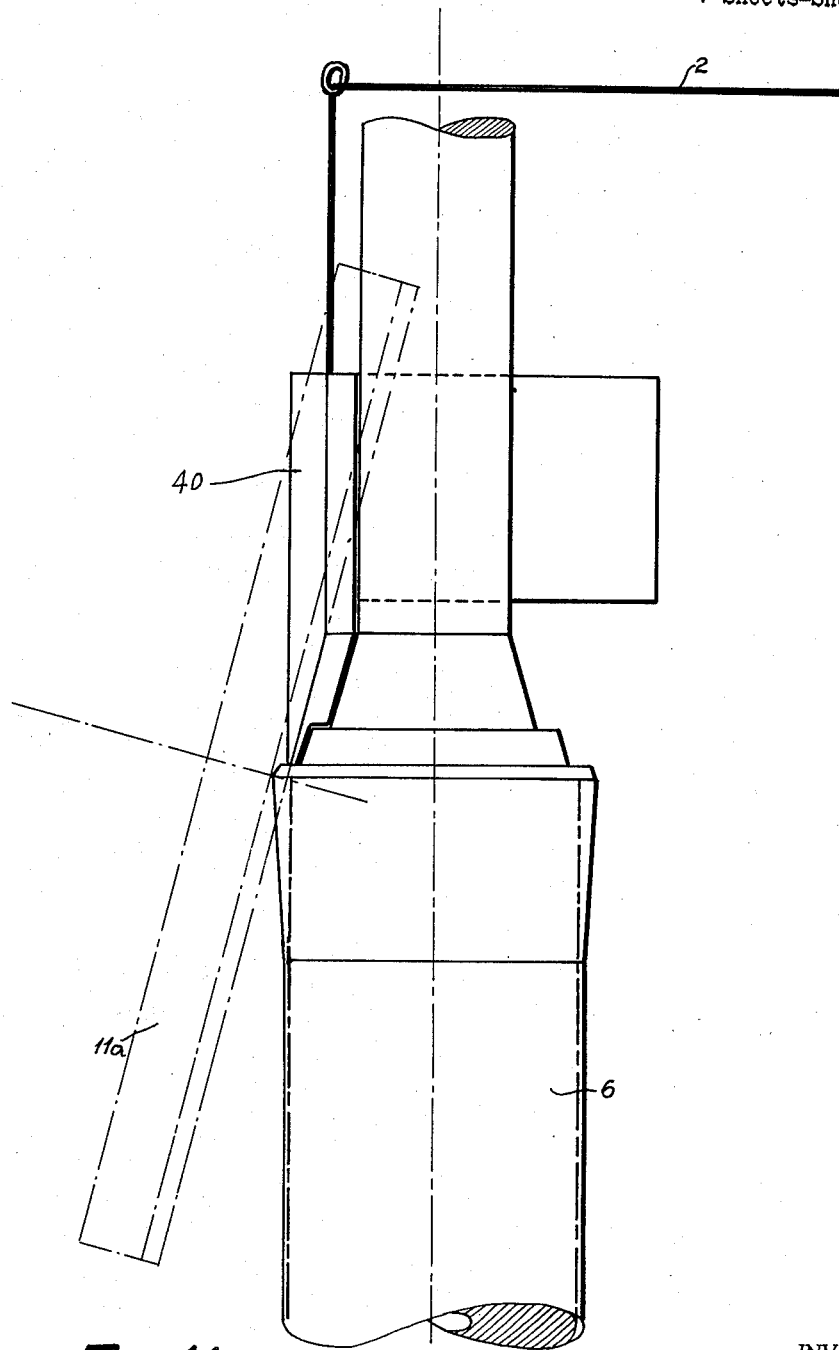

United States Patent Office 2,903,745
Patented Sept. 15, 1959

2,903,745

MACHINE FOR SHAPING A STRING OR BAND INTO SERPENTINE-LIKE CONFIGURATION

Harry Hansen, Valby-Copenhagen, Denmark

Application January 8, 1957, Serial No. 633,019

Claims priority, application Denmark January 16, 1956

6 Claims. (Cl. 18—19)

This invention relates to a machine for the production of a serpentine-like structure consisting of a string bent back and forth to form open loops directed alternately one way and the other. The term "string" as used in this specification is intended to include any form of ribbon, band, thread, strip, filament or similar element of any cross sectional configuration.

More particularly, though not exclusively, the invention is intended for use in the production of a row of coupling links in the form of a serpentine-like structure as described. One example of a slide fastener, in which one row of coupling links consists of a structure as set forth while the other row of coupling links consists of a coiled thread, is described in my co-pending application Serial No. 592,915, filed June 21, 1956. Another example of a slide fastener, in which both rows of coupling links consist of serpentine-like strings, is described in an application filed January 8, 1957, Serial No. 633,009, now Patent No. 2,878,514. The type of slide fasteners here concerned is of particular interest where it is desired to make the rows of coupling links from flexible non-metallic materials such as modern plastics, among which nylon is an example.

In the case of a serpentine-like string intended for use as a row of coupling links of a slide fastener it will generally be preferable to use a string of rectangular or oblong cross section and to bend this perpendicularly to its principal plane so that in the finished serpentine-like structure the string will have its largest dimension directed perpendicularly to the longitudinal direction of the structure, and the invention consequently also contemplates the production of a structure of this particular type.

It is to be observed, however, that the machine according to the invention can also be used for treating strings of any other cross sectional shape and from any material capable of being bent into a structure of the type concerned, such as metals, and for any use other than as the rows of coupling links of slide fasteners.

It is an object of the invention to devise means, by which a structure as set forth can be produced at great speed with a minimum danger of rupture of the string and in such a manner that the loops of the string can be given a very accurate shape and spacing, and the structure will not, after having been shaped, be subjected to forces tending to change the configuration it has assumed.

It is also an object of the invention to obtain a serpentine-like structure of accurately over-all plane shape without irregular bends, curls or twists, and in such a manner that, in the case of a string of oblong cross sectional shape, the largest dimension of the cross section will extend accurately perpendicularly to the over-all plane of the structure or at a desired angle thereto.

A further object of the invention is to provide means by which a structure of the type defined can be produced, in which the loops extending in one direction have a so-called undercut configuration, i.e. are composed of a narrower neck portion and a wider head portion. It will even be advantageous in most cases, where the structure is to be used as a row of coupling links of a slide fastener to drive the "undercutting" so far that the inner flank portion of the loops are pressed completely together in the said neck portion even at a bias, if desired, and it is therefore also contemplated, according to the invention, to produce a structure of this special configuration.

According to a principal feature of the invention, a machine for the production of a serpentine-like structure, as defined, comprises a screw spindle, a toothed element engaging with said spindle with a clearance sufficient to receive a string to be treated in the machine, and means for passing a string into and through the zone of engagement between said spindle and said toothed element.

Figure 2:
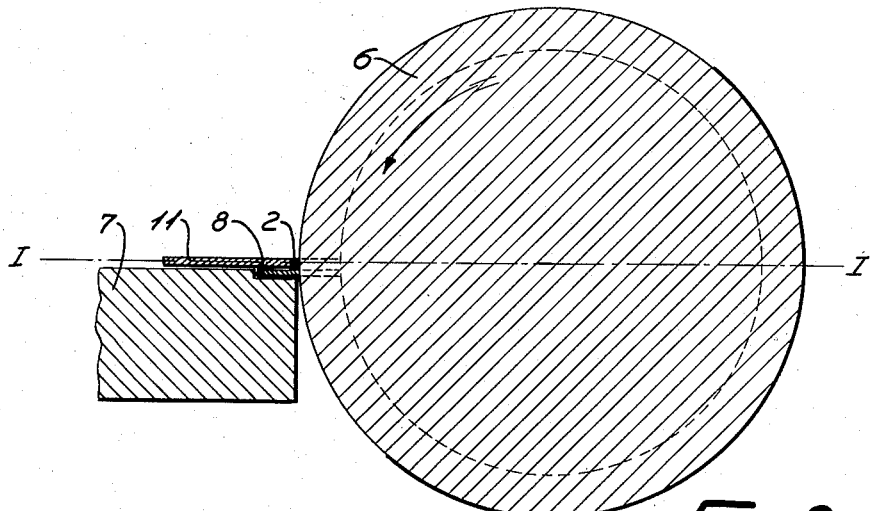
Figure 3:
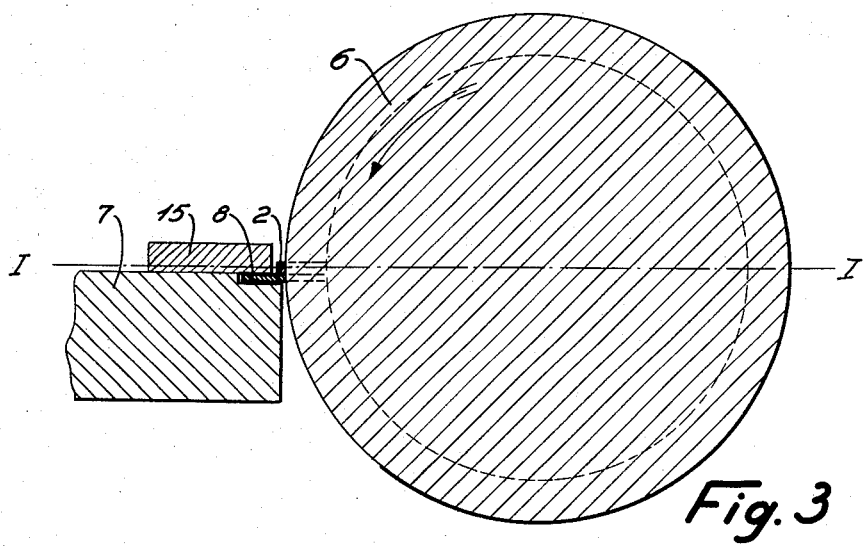
Figure 4:
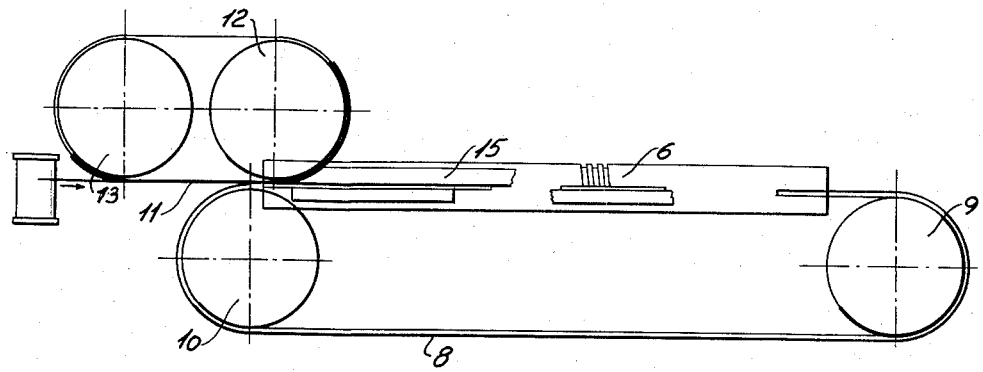
Figure 5:
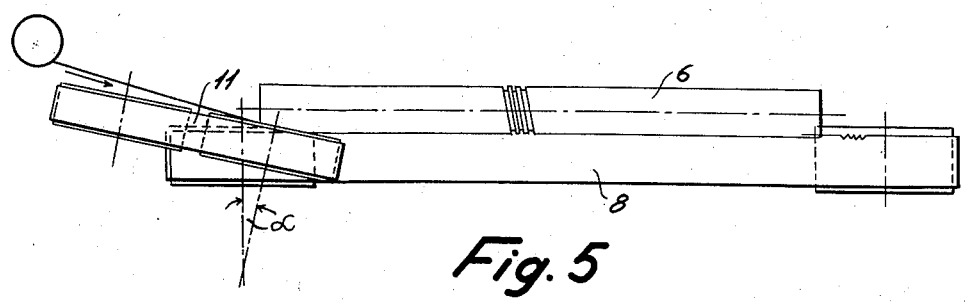
Figure 6:
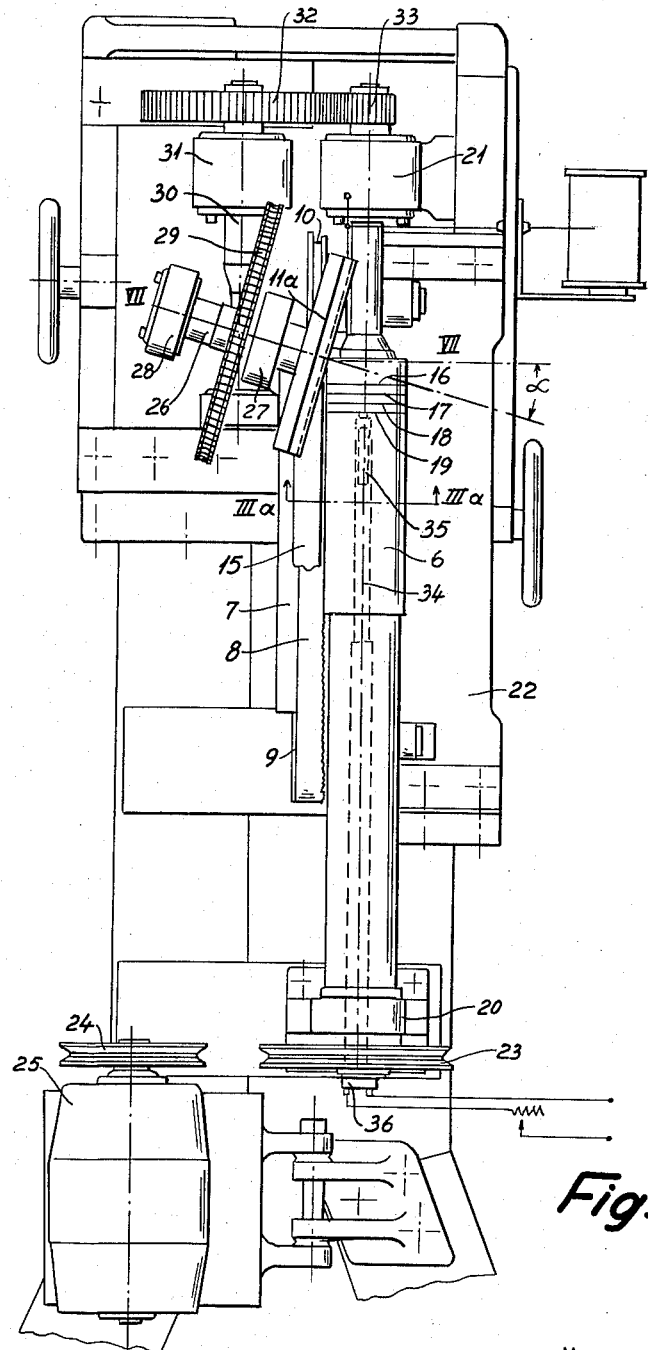
Figure 7:
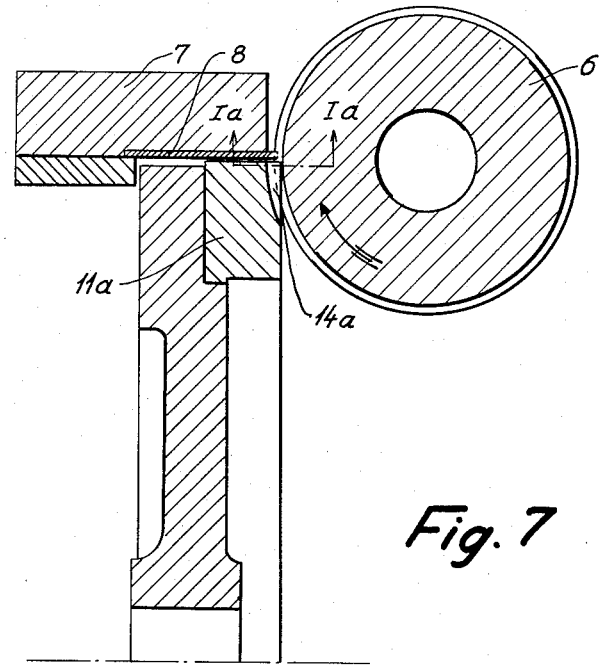
Figure 8:
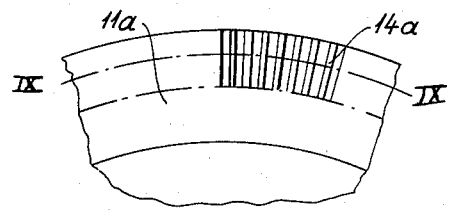
Figure 9:
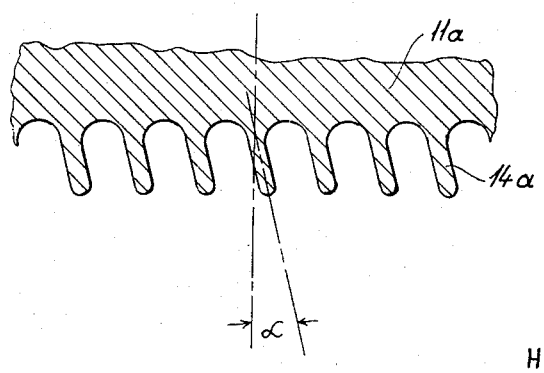

Other objects and features of the invention will be apparent from the following detailed description with reference to the accompanying drawings, in which Fig. 1 is a longitudinal sectional view on an enlarged scale and showing the loop forming and shaping parts of a machine according to one embodiment of the invention, Fig. 2 a cross section along the line II—II of Fig. 1, Fig. 3 a cross section along the line III—III of Fig. 1, Fig. 4 a diagrammatic side view of the essential parts of the machine as seen in the direction of the arrows IV—IV in Fig. 1, Fig. 5 a corresponding diagrammatic top view, Fig. 6 a full front view of a machine according to a slightly modified embodiment of the invention, Fig. 7 on an enlarged scale a diagrammatic section along the broken line VII—VII of Fig. 6, Fig. 8 on the same scale as Fig. 7, a fragmental front view of a toothed wheel forming part of the machine, Fig. 9 on a still larger scale a developed fragmental section along the curved line IX—IX of Fig. 8, Fig. 10 is a plan view of the detail of the spindle and the toothed element, and Fig. 11 is a side view of the detail of the spindle and the toothed element.

While two embodiments of the invention have been illustrated, it is to be understood that these only differ as regards the construction of a single element, apart from the fact that one embodiment is shown in horizontal position and the other in upright position which is merely a matter of choice. It has therefore been found sufficient to show a full view of one of the machines, and such views as are identical for both machines have only been illustrated once, while like parts have been denoted by the same reference characters in both embodiments.

A description of the process according to the invention and the essential elements of the machine for carrying it into effect will first be given with particular reference to Figures 1–5.

In these figures, 6 is a screw spindle, along one side of which there is mounted a fixed supporting rail 7 having its supporting surface extending substantially diametrically with respect to the spindle 6. Along the edge of the rail facing the spindle 6 there is provided a flat recess forming a guide path for one run of an endless band 8, in the following referred to as supporting band, which is guided over rollers 9 and 10 and is constructed along the edge thereof with teeth engaging between the screwthread tops of the screw spindle 6.

Superposed on the supporting band 8 along a short length of the screw spindle 6 at one end thereof is one run of a second endless band 11, in the following referred to as shaping band. This band is guided over rollers 12 and 13 and has its active run, above referred to, extending at an angle to the longitudinal direction of the spindle, as is clearly seen in Figure 1. It is provided with marginal teeth 14, which are directed at an inclination to the transverse direction of the band such that these teeth will extend parallel to the profile of the screwthread tops of the screw spindle 6 between which they engage. Along the length of the screw spindle following the zone in which the shaping band 11 is active, a guiding rail 15 is mounted on the top of the supporting rail 7 in a position such as to overhang the band 8 travelling in the marginal recess thereof so as to have its guiding surface extending along the screw spindle 6 at a short distance therefrom. The guide rail 15 should extend as far as possible towards the input end of the spindle 6. This is the reason why the shaping band 11 is guided in an inclined path relative to the screw spindle, and for the same reason it is guided upwards around the roller 12 as soon as possible after having been in operative engagement with the screw spindle.

A string to be shaped into a serpentine-like structure is passed into the zone of engagement between the screw spindle 6 and the shaping band 11 at the left hand end of the screw spindle as illustrated in Figure 1, sufficient clearance being provided between the screwthread of the spindle and the teeth of the shaping band to allow for the passage of the string therebetween. By the engagement of the teeth of the shaping band 11 with the screwthread of the spindle the string is formed into open loops facing alternately one way and the other as illustrated. The direction of rotation of the spindle is such that the circumferential movement thereof will be directed towards the supporting surface of the supporting band 8, which will thus prevent the string from following the rotary movement of the spindle and will therefore keep the string in correct position along one side of the spindle not only in the zone of engagement between the latter and the shaping band, but along the whole length of the spindle.

The first turn of the screwthread of the spindle has a height, as measured from its root to its top, which varies gradually from zero to full height. Consequently, an open loop of full height will be formed in the string already during the first revolution of the screw spindle 6 after the string has been engaged between the latter and the shaping band 11. This is advantageous because the length of string necessary to form the loop can then freely be drawn in between the elements forming the loop, which would not be the case if the pressing up of the loop to full height were distributed over a number of revolutions, because the additional length of string required for each subsequent pressing up stage would have to be taken from parts of the string already lying completely trapped between the engaging elements.

As soon as possible after the loops have been formed the string is caught from behind by the guiding rail 15 and is thereby kept in engagement with the screwthread of the spindle while travelling along the whole length thereof. During the whole of this travel, the supporting band 8 prevents the string from being dragged along in the rotary movement of the screw spindle, as above described.

It will be seen that in the zone of engagement between the screwthread of the spindle 6 and the teeth of the shaping band 11, both said screwthread and said teeth are constructed with profile having straight flanks perpendicular to the axis of the screw spindle, and the loops formed in the string will therefore likewise have straight flanks. If it is desired to form loops of so called undercut shaps, this can be done by varying the profile of the screwthread of the spindle 6 along the length thereof, either continuously or in a plurality of stages between which there may be zones of rest where the profile of the screwthread remains unchanged. Preferably, the change of the profile of the screwthread in each stage will be gradual over a certain length of the screwthread, say one convolution thereof.

In the example illustrated in Figure 1, the profile of the screwthread of the spindle 6 remains unchanged from the input end of the spindle to the diametrical plane denoted by the reference character 16. A second zone of the screw spindle extending from the plane 16 to the plane 17 comprises two turns of the screwthread of the spindle. Of these the first turn starts with the same profile as that at the output end of the previous zone and gradually changes to a slightly undercut shape, which is then maintained along the second turn. In a third zone of the screw spindle between the planes 17 and 18, and a fourth zone between the planes 18 and 19, the profile of the screwthread changes in two stages to a more undercut shape in exactly the same manner as in the zone between the planes 16 and 17. Finally, in a fifth zone following the plane 19, the profile of the screwthread is changed to a shape which is so much undercut that the flanks of the inward loops of the string are pressed completely together to form narrower necks behind the wider heads of the inward loops of the string.

It will be understood that the modification of the profile of the screwthread to undercut shape is obtained by constructing the screwthread with increasing width at its top while leaving the width of the screwthread unchanged at the root thereof. It will also be understood that the teeth of the supporting band 8 must have a shape such as to be capable of engaging between the widened screwthread tops in the zone of the spindle following the plane 19 and will consequently engage between the screwthread tops in the first zone of the spindle with a somewhat greater clearance which however does not prevent them from adequately supporting the loops of the string in this zone.

In practice it has been found preferable to construct the various zones of the spindle 6 as separate sections mounted on a common core.

Referring now to the embodiment illustrated in Figures 6–11, it is observed that these figures should be taken in conjunction with Figures 1 and 3, which also show diagrammatic enlarged sections along the lines Ia—Ia in Figure 7 and IIIa—IIIa in Figure 6 respectively.

In this embodiment, the spindle 6 is mounted in vertical position in bearings 20 and 21 in a machine frame generally indicated by the reference character 22. Attached to the lower end of the spindle 6 is a pulley 23, which is driven by a V-belt, not shown, from a pulley 24 on the shaft of an electric motor 25.

The shaping band 11 has been replaced by a toothed wheel 11a attached to a shaft 26 mounted in bearings 27 and 28. Also mounted on the shaft 26 is a worm gear wheel 29 meshing with a worm gear on a spindle 30 mounted in a bearing 31 and carrying a gear wheel 32 meshing with a gear wheel 33 on the top of the spindle 6. In this manner the toothed wheel 11a is driven in exact synchronism with the rotation of the spindle 6.

The toothed wheel 11a is constructed in the face thereof with teeth 14a engaging with the screwthread of the spindle 6 in exactly the same manner as the teeth 14 of the shaping band 11 in the embodiment first described. In the zone of engagement, the teeth 14a should travel in a path inclined to the longitudinal direction of the screw spindle as illustrated in Figure 1, where this path of travel of the teeth is represented in developed illustration. To obtain this the toothed wheel 11 is mounted with its axis at an angle $v$ to a plane perpendicular to the longitudinal direction of the screw spindle. To obtain correct engagement, the teeth 14a must then be constructed to have their longitudinal direction (i.e. root to top direction) extending at the same angle to the axis of the toothed wheel, as clearly illustrated in Figure 9. In the embodiment illustrated, the teeth 14a are formed by making inclined circular cuts into the face of the toothed wheel 11a along radial lines, said cuts being open and having their maximum depth at the circumference of the toothed wheel.

Figs. 10 and 11 show on an enlarged scale the spindle 6 together with the guide block 40. This guide block for the filament has a longitudinal passage run through which the filament passes and at its lower end it has a projecting nose in which the filament is guided in a groove.

The construction of the spindle 6, the supporting rail 7, the supporting band 8 and its guide rollers 9 and 10, and the guide rail 15 is exactly the same as in the embodiment first described, and the operation is also the same.

As illustrated in Figure 6, the spindle 6 is constructed with an axial bore 34 at the top of which there is arranged an electric heating element 35, to which current is supplied from contact rings diagrammatically represented at 36 at the bottom end of the spindle. By means of the heating element 35 the zone of the spindle immediately following the diametrical plane 19 is heated to a suitable temperature, while the lower part of the spindle remains cooler. Consequently, the looped string, while travelling along the screw spindle in engagement therewith, after having been shaped as desired, is first heated and then again allowed to be cooled. This thermal treatment serves the purpose of stabilizing the string in the exact shape, into which it has been transfigured. This operation is particularly useful when the string consists of a thermoplastic material such as nylon, but it may also be used for other materials, such as to remove internal stresses that have been set up in the material during the shaping process.

I claim:

1. A machine for the production of a serpentine-like structure consisting of a string bent back and forth to form open loops directed alternately one way and the other, particularly for use as a row of coupling links of a slide fastener, said machine comprising a screw spindle, a fixed support extending along the length of said spindle in a plane substantially diametrical with respect to said spindle, an endless band having one run thereof extending along said support to be supported thereby, said endless band being constructed with teeth engaging with the screw thread of said spindle, a toothed element engaging with the screw thread of said spindle adjacent one end thereof and at a circumferential location immediately adjacent and on one side only of said endless band, said toothed element being constructed to have it engaging teeth travelling substantially longitudinally of said spindle, means for passing a string into and through the zone of engagement between said spindle and said toothed element so as to form loops in said string, and means for keeping the loops thus formed in engagement with the screwthread of said spindle, thereby to cause said string to travel along said spindle with its loops supported on said endless band.

2. A machine as in claim 1 in which said toothed element is in the form of a toothed wheel having its axis directed at an angle to a plane perpendicular to the axis of the spindle and having its teeth provided in one face thereof and extending at the same angle as above specified to the axis of the toothed wheel.

3. A machine as in claim 1 in which said toothed element is in the form of a toothed endless band having the engaging run thereof extending at an angle to the longitudinal direction of said spindle.

4. A machine as in claim 1 in which said screw spindle has the first turn of its screwthread constructed with varying height, increasing gradually from zero to full height.

5. A machine as in claim 1 in which said spindle is constructed with a first zone having a screwthread with substantially straight flanks and forming said zone of engagement at the input end thereof, and subsequent zones in which the screwthread is changed to undercut shape, means being provided for keeping the loops formed in the string in engagement with the screwthread along all of said zones thereof.

6. A machine as in claim 5 in which each of said zones has its screwthread constructed with a profile that starts with the same shape as that at the output end of the previous zone and then changes gradually to a modified shape which is then kept unchanged for some distance.

References Cited in the file of this patent

UNITED STATES PATENTS

| 1,399,098 | Winter | Dec. 6, 1921 |
| 2,467,227 | Potter et al. | Apr. 12, 1949 |
| 2,589,041 | Bremer | Mar. 11, 1952 |
| 2,737,212 | Huszar | Mar. 6, 1956 |

FOREIGN PATENTS

| 413,608 | Italy | May 20, 1946 |